US011373811B2

(12) United States Patent
Robichaud

(10) Patent No.: US 11,373,811 B2
(45) Date of Patent: *Jun. 28, 2022

(54) ELECTRICAL CAPACITOR BANK

(71) Applicant: NU-WAVE TECHNOLOGIES CORP., Cocagne (CA)

(72) Inventor: Oscar Robichaud, Cocagne (CA)

(73) Assignee: NU-WAVE TECHNOLOGIES CORP., Vaughan (CA)

(*) Notice: Subject to any disclaimer, the term of this patent is extended or adjusted under 35 U.S.C. 154(b) by 141 days.

This patent is subject to a terminal disclaimer.

(21) Appl. No.: 16/841,722

(22) Filed: Apr. 7, 2020

(65) Prior Publication Data

US 2021/0043388 A1 Feb. 11, 2021

Related U.S. Application Data

(63) Continuation of application No. 16/536,173, filed on Aug. 8, 2019, now Pat. No. 10,650,979.

(51) Int. Cl.
*H01G 4/38* (2006.01)

(52) U.S. Cl.
CPC .................... *H01G 4/385* (2013.01)

(58) Field of Classification Search
CPC ........ H01G 4/002; H01G 4/005; H01G 4/228; H01G 4/38; H01G 4/385; H01G 4/40; H02M 1/02; H02M 1/08; H02M 1/10; H02M 1/14; H02M 1/42; H02M 2001/0003; Y02B 70/10

See application file for complete search history.

(56) References Cited

U.S. PATENT DOCUMENTS

| | | | | |
|---|---|---|---|---|
| 5,293,110 A | * | 3/1994 | Andrei | H02J 3/1821 323/208 |
| 8,912,801 B2 | | 12/2014 | Gajic et al. | |
| 10,650,979 B1 | * | 5/2020 | Robichaud | H01G 4/385 |
| 2008/0174255 A1 | * | 7/2008 | Schnetzka | H05K 7/20936 318/12 |
| 2012/0153728 A1 | * | 6/2012 | Athas | H02M 3/07 307/80 |
| 2014/0177124 A1 | | 6/2014 | Nunez-Barranco Patino | |
| 2015/0188306 A1 | | 7/2015 | Yalla | |

FOREIGN PATENT DOCUMENTS

| | | | | |
|---|---|---|---|---|
| RU | 2229766 C1 * | 5/2004 | | H02J 3/18 |
| WO | WO-2011111058 A2 * | 9/2011 | | H02J 3/1828 |

* cited by examiner

*Primary Examiner* — Matthew V Nguyen
(74) *Attorney, Agent, or Firm* — Bereskin & Parr LLP/S.E.N.C.R.U.L., s.r.l.

(57) ABSTRACT

A capacitor bank that includes at least two capacitors wherein the capacitor bank is configured to change the quantity of phases of the input voltage within the capacitor bank. The capacitor bank of the preferred embodiment of the present invention includes a first capacitor and a second capacitor. The first capacitor and second capacitor are three phase capacitors each having three terminals configured to couple to an input voltage. The capacitor bank is wired so as to have a first source of an input voltage coupled to two terminals of the first capacitor and one terminal of the second capacitor. A second source of the input voltage is electrically coupled to one terminal of the first capacitor and two terminals of the second capacitor. The capacitor bank is operable to change the double phase input voltage into three phases within the capacitor bank.

20 Claims, 2 Drawing Sheets

ELECTRICAL CAPACITOR BANK

CROSS-REFERENCE TO RELATED APPLICATIONS

This application claims priority to U.S. patent application Ser. No. 16/536,173 filed on Aug. 8, 2019. The entire disclosure of U.S. patent application Ser. No. 16/536,173 is incorporated herein by reference.

FIELD OF THE INVENTION

The present invention relates generally to electrical power management, more specifically but not by way of limitation, an electrical capacitor bank that is configured to reduce the total kilowatts needed for operation of an electrical device such as but not limited to an electrical motor.

BACKGROUND

As is known in the art capacitors store an electrical charge for a subsequent use. Electrical capacitors consist of one or more pairs of conductors that are separated by an insulating material. Conventional capacitors are connected in parallel often with direct current power circuits to provide current absent of fluctuations. Power is provided in phases conventionally referred to as double-phase or three-phase voltage. The difference between phases is ranges from one hundred and twenty degree difference to one hundred and eighty degree difference. In an alternating current electrical system, power factor is the ratio of real power absorbed by the load to the apparent power flowing in the circuit. This is a dimensionless number in the closed interval of negative one to positive one. A power factor of less than one indicates the voltage and current are not in phase. Real power is the instantaneous product of voltage and current and represent the capacity of the electricity for performing work. Apparent power is the average product of current and voltage.

In an electric power system, a device having a load with a low power factor draws more current than device having a load with a high power factor for the same amount of useful power transferred. The higher currents increase the energy lost in the system, and require larger wires and other equipment. Because of the costs of larger equipment and wasted energy due to the aforementioned inefficiencies, electrical utility companies will usually charge a higher cost to industrial or commercial customers where there is a low power factor.

Accordingly, there is a need for an electrical capacitor bank that provides an arrangement that is operable to change the electrical phase input so as to reduce the amount of amperes needed to operate a device such as an electrical motor having a ampere requirement that is greater than the input amperes.

SUMMARY OF THE INVENTION

It is the object of the present invention to provide a capacitor bank and wiring arrangement thereof that is operable to increase the phase output from the received phase input wherein the capacitor bank utilizes at least two capacitors.

Another object of the present invention is to provide a capacitor bank configured to produce three phase output subsequent receipt of double phase input wherein each of the capacitors include three connection terminals.

A further object of the present invention is to provide a capacitor bank and wiring arrangement thereof that is operable to increase the phase output from the received phase input configured to produce three phase output from two phase input in order to achieve reduction of total amperage consumption.

Still another object of the present invention is to provide a capacitor bank configured to produce three phase output subsequent receipt of double phase input wherein an alternative embodiment of the present invention is applicable to three phase input.

An additional object of the present invention is to provide a capacitor bank and wiring arrangement thereof that is operable to increase the phase output from the received phase input in order to achieve a power factor for the user thereof of at least ninety percent.

Yet a further object of the present invention is to provide a capacitor bank configured to produce three phase output subsequent receipt of double phase input wherein the distribution of the line input across the capacitor bank provides phase conversion thereof within the capacitor bank.

Another object of the present invention is to provide capacitor bank and wiring arrangement thereof that is operable to increase the phase output from the received phase input wherein the capacitors utilized in the capacitor bank are rated between 1 to 10,000 KVAR.

Still and additional object of the present invention is to provide a capacitor bank configured to produce three phase output subsequent receipt of double phase input wherein the capacitor bank of the present invention can be configured to receive input voltage within the range of 120 to 138,000 volts.

To the accomplishment of the above and related objects the present invention may be embodied in the form illustrated in the accompanying drawings. Attention is called to the fact that the drawings are illustrative only. Variations are contemplated as being a part of the present invention, limited only by the scope of the claims.

BRIEF DESCRIPTION OF THE DRAWINGS

A more complete understanding of the present invention may be had by reference to the following Detailed Description and appended claims when taken in conjunction with the accompanying Drawings wherein:

DETAILED DESCRIPTION

Figure 1:
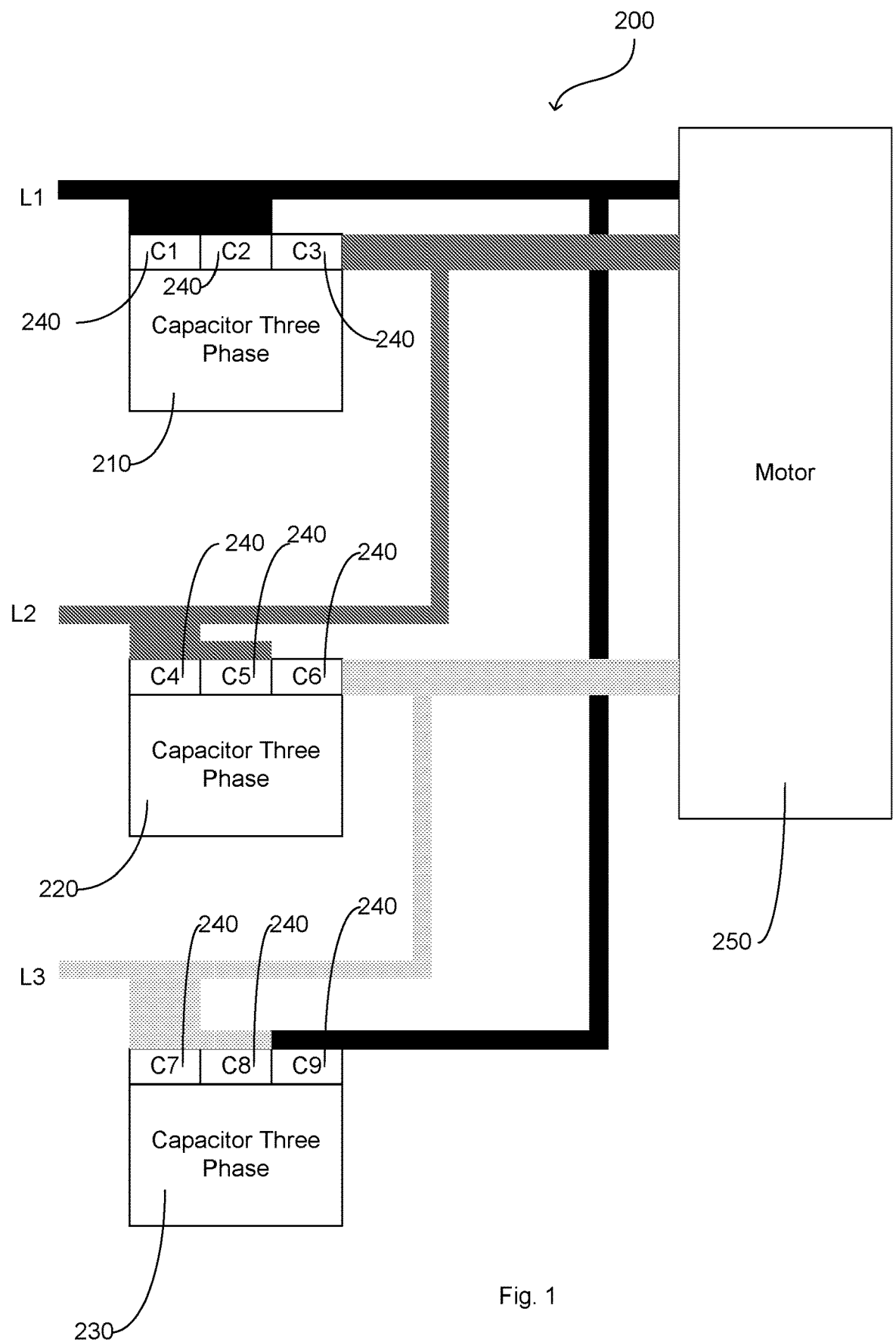
FIG. 1 is a block diagram of a capacitor bank of the present invention configured for three phase electrical input.

Referring now to the drawings submitted herewith, wherein various elements depicted therein are not necessarily drawn to scale and wherein through the views and figures like elements are referenced with identical reference numerals, there is illustrated a capacitor bank 100 constructed according to the principles of the present invention.

An embodiment of the present invention is discussed herein with reference to the figures submitted herewith. Those skilled in the art will understand that the detailed description herein with respect to these figures is for explanatory purposes and that it is contemplated within the scope of the present invention that alternative embodiments are plausible. By way of example but not by way of limitation, those having skill in the art in light of the present teachings of the present invention will recognize a plurality of alternate and suitable approaches dependent upon the needs of the particular application to implement the functionality of any given detail described herein, beyond that of the particular implementation choices in the embodiment described herein. Various modifications and embodiments are within the scope of the present invention.

It is to be further understood that the present invention is not limited to the particular methodology, materials, uses and applications described herein, as these may vary. Furthermore, it is also to be understood that the terminology used herein is used for the purpose of describing particular embodiments only, and is not intended to limit the scope of the present invention. It must be noted that as used herein and in the claims, the singular forms "a", "an" and "the" include the plural reference unless the context clearly dictates otherwise. Thus, for example, a reference to "an element" is a reference to one or more elements and includes equivalents thereof known to those skilled in the art. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

References to "one embodiment", "an embodiment", "exemplary embodiments", and the like may indicate that the embodiment(s) of the invention so described may include a particular feature, structure or characteristic, but not every embodiment necessarily includes the particular feature, structure or characteristic.

Referring now in particular to the Figures submitted as a part hereof, the capacitor bank 100 includes a first capacitor 10 and a second capacitor 20. The first capacitor 10 and second capacitor 20 are conventional three phase capacitors. As is known in the art, capacitors are passive electrical components consisting of conductors separated by a non-conductive region, which can be configured in alternate manners. Within the scope of the present invention the first capacitor 10 and second capacitor 20 are manufactured as conventional capacitors wherein the first capacitor 10 and second capacitor 20 are configured for three phase power as is further discussed herein.

Figure 2:
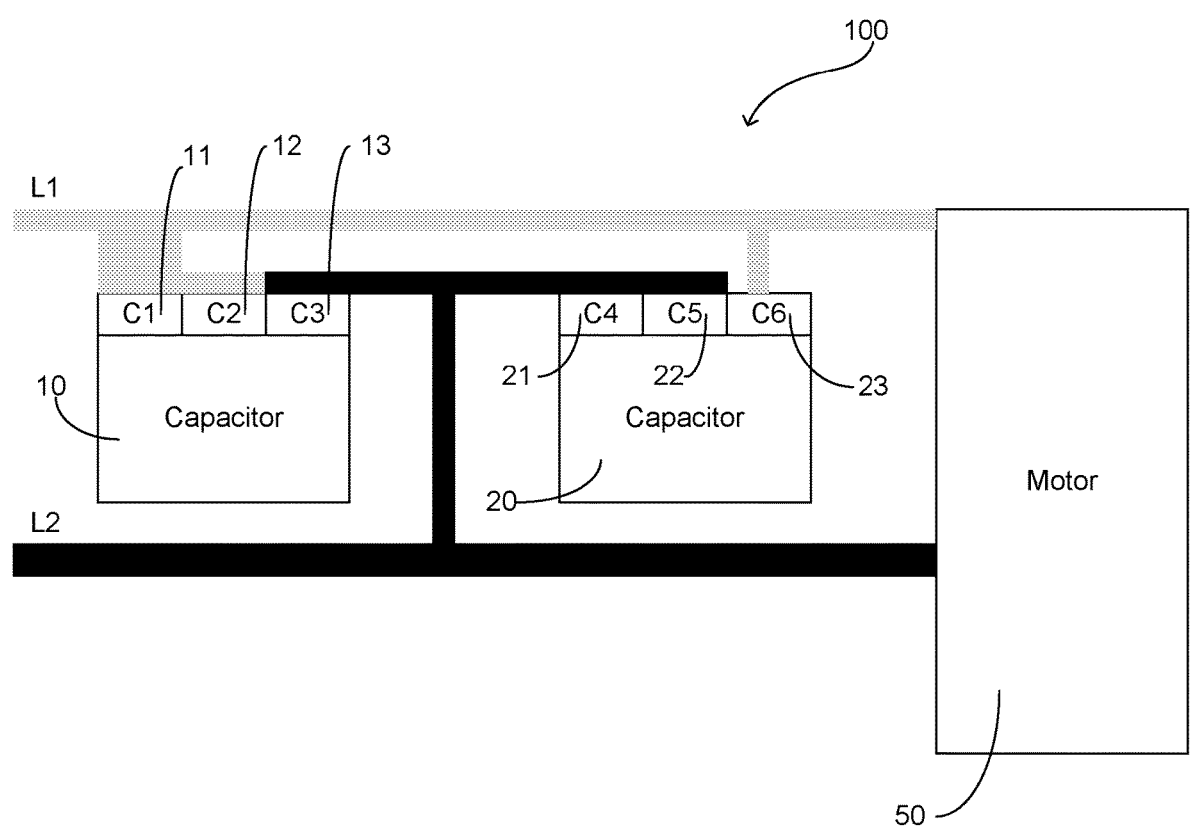
FIG. 2 is a block diagram of a capacitor bank of the present invention configured for double phase electrical input.

The first capacitor 10 includes a first terminal 11, second terminal 12 and third terminal 13. The first terminal 11, second terminal 12 and third terminal 13 are configured to electrically couple to input voltage L1 and L2. The second capacitor 20 also includes terminals 21, 22 and 23. The terminals 21, 22 and 23 are also configured to be electrically coupled to either input voltage of L1 and/or L2. As is shown in FIG. 2 herein, the distribution of input voltage L1 and L2 produces the input voltage phase conversion within the first capacitor 10 and second capacitor 20 wherein the phase conversion results from changing the double phase input of L1 and L2 into a three phase voltage within the capacitor bank 100 as the first capacitor 10 and second capacitor 20 are three phase capacitors. Conversion of the double phase input to three phase within the capacitor bank is achieved through the illustrated operable connections of the input voltage L1 and L2 across the first capacitor 10 and second capacitor 20. This results in a decrease in amperage of at least fifty percent. By way of example but not limitation, a two and a half horse power motor 50 requiring two hundred and forty volts was conventionally wired utilizing double phase input and resulted in a amperage consumption of approximately thirteen amps. Placing the capacitor bank 100 electrically intermediate the input voltage and the electric motor 50, the electric motor 50 at operation was measured at approximately three amperes of draw.

Input voltage L1 is electrically coupled to the first terminal 11 and second terminal 12 of the first capacitor 10. Additionally, the input voltage L1 is further electrically coupled to third terminal 23 of the second capacitor 20. Input voltage L2 is electrically coupled to the third terminal 13 of the first capacitor 10 and terminals 21,22 of the second capacitor 20. The input voltage of L1 and L2 can be either one hundred and twenty volts or two hundred and forty volts. In the exemplary embodiment discussed prior hereto and illustrated in FIG. 1, the first capacitor 10 and second capacitor 20 have a rating of one to ten thousand KVAR. The illustrated wiring configuration of L1 and L2 alters the double phase input thereof into three phases within the first capacitor 10 and second capacitor 20. The electrical connections are specific because of the wave form of the input voltage L1 and L2. The wiring configuration results in the ability to operate electrical devices such as but not limited to an electrical motor 50 utilizing less amperes so as ultimately to reduce overall power consumption.

Input voltage L1 is electrically coupled twice to the first capacitor 10 and once to the second capacitor 20. The input voltage L2 is electrically coupled twice to the second capacitor 20 and once to the first capacitor 10. The aforementioned electrical couplings provide conversion within the capacitor bank 100 of double phase power into three phase power within the capacitor bank 100. Connection of the input voltage twice to a first capacitor and once to second capacitor within the capacitor bank 100 provides the discussed benefit of amperage reduction and further provides a power factor of at least ninety percent so as to reduce or eliminate additional fees that may be charged by a utility provider for having a power factor that is less than ninety percent. It should be understood within the scope of the present invention that the input voltage could range form 120 volts to 138,000 volts.

Now referring to FIG. 1 submitted herewith, an alternative embodiment of the capacitor bank 200 is illustrated therein. Capacitor bank 200 is similar to capacitor bank 100 but capacitor bank 200 includes a first capacitor 210, second capacitor 220 and third capacitor 230 electrically coupled to motor 250. The capacitor bank 200 is configured to be electrically coupled to three phase power (L1, L2, L3). The first capacitor 210, second capacitor 220 and third capacitor 230 are all three phase capacitors conventionally manufactured each having three terminals 240. The capacitor bank 200 is electrically coupled to three phase power represented in FIG. 2 herein with L1, L2 and L3 designations. As previously discussed herein, each input voltage is electrically coupled twice to a single capacitor and once to another capacitor present in the capacitor bank 200. The capacitor bank 200 is configured to receive voltage inputs ranging from 120 volts to 4160 volts. The first capacitor 210, second capacitor 220 and third capacitor 230 are rated between 1 and 10,000 KVAR. While two embodiments of the capacitor bank 100, 200 have been illustrated herein having a particular number of capacitors, it is contemplated within the scope of the present invention that the present invention could employ alternate quantities of capacitors depending upon the quantity of phases of the power being electrically coupled thereto. In order to achieve the wiring distribution discussed and illustrated herein, the quantity of capacitors within the capacitor bank 100, 200 are equal to the quantity of input voltage lines. Additionally, it is intended within the scope of the present invention that the input voltage for the capacitor bank 200 could be configured to range from 120 to 138,000 volts.

In the preceding detailed description, reference has been made to the accompanying drawings that form a part hereof, and in which are shown by way of illustration specific embodiments in which the invention may be practiced. These embodiments, and certain variants thereof, have been described in sufficient detail to enable those skilled in the art to practice the invention. It is to be understood that other suitable embodiments may be utilized and that logical changes may be made without departing from the spirit or scope of the invention. The description may omit certain information known to those skilled in the art. The preceding detailed description is, therefore, not intended to be limited to the specific forms set forth herein, but on the contrary, it is intended to cover such alternatives, modifications, and equivalents, as can be reasonably included within the spirit and scope of the appended claims.

What is claimed is:

1. A method for providing a capacitor bank intermediate a power source and an electrically operated device, the method comprising:
    providing at least two three phase capacitors configured to alter a power phase therein, each capacitor of the at least two three phase capacitors having three terminal connections; and
    electrically coupling the at least two three phase capacitors to an input voltage, thereby lowering an amperage of an incoming voltage.

2. The method of claim 1 further comprises:
    providing the input voltage via a first input voltage line and a second input voltage line.

3. The method of claim 2, wherein the at least two three phase capacitors comprises a first capacitor and a second capacitor, and electrically coupling the input voltage comprises:
    electrically coupling the first input voltage line to two of the three terminals of the first capacitor, and to one the three terminals of the second capacitor.

4. The method of claim 3, wherein electrically coupling the input voltage further comprises:
    electrically coupling the second input voltage line to two remaining terminals of the three terminals of the second capacitor, and one remaining terminal of the three terminals of the first capacitor.

5. The method of claim 1 further comprises providing at least a two phase input voltage as the input voltage.

6. The method of claim 1 further comprises converting a two phase input voltage to a three phase input voltage.

7. The method of claim 1, wherein the at least two three phase capacitors has a rating approximately between 1 to 10,000 KVAR.

8. The method of claim 1, wherein the input voltage is within a range of approximately 120 volts to 138,000 volts.

9. The method of claim 1, wherein the input voltage is within a range of approximately 120 volts to 4,160 volts.

10. The method of claim 1 further comprises operating the capacitor bank to provide an ampere consumption reduction of at least fifty percent.

11. The method of claim 1 further comprises operating the capacitor bank to provide a power factor of at least ninety percent.

12. A method for providing a capacitor bank to change double phase power into three phase power, the method comprising:
    providing a first three phase capacitor having three terminals and a second three phase capacitor having three terminals;
    electrically coupling the first three phase capacitor to an input voltage; and
    electrically coupling the second three phase capacitor to the input voltage and the first three phase capacitor, whereby the input voltage is distributed across the first three phase capacitor and the second three phase capacitor and a phase of the input voltage changes from double phase to three phase.

13. The method of claim 12, wherein electrically coupling the first three phase capacitor to the input voltage comprises:
    electrically coupling a first source of the input voltage to two of the three terminals of the first three phase capacitor.

14. The method of claim 12, wherein electrically coupling the second three phase capacitor to the input voltage and the first three phase capacitor comprises:
    electrically coupling a first source of the input voltage to one of the three terminals of the second three phase capacitor.

15. The method of claim 14 further comprises:
    electrically coupling a second source of the input voltage to two of the three terminals of the second three phase capacitor.

16. The method of claim 15 further comprises:
    electrically coupling the second source of the input voltage to one of the three terminals of the first three phase capacitor.

17. The method of claim 12 comprises providing the first three phase capacitor and the second three phase capacitor each having a rating of approximately between 1 to 10,000 KVAR.

18. The method of claim 12 comprises providing the input voltage within the range of approximately 120 to 138,000 volts.

19. The method of claim 12 further comprises operating the capacitor bank to provide an ampere consumption reduction of at least fifty percent.

20. The method of claim 12 further comprises operating the capacitor bank to provide a power factor of at least ninety percent.

* * * * *